US005411380A

United States Patent [19]

Bristol et al.

[11] Patent Number: 5,411,380

[45] Date of Patent: May 2, 1995

[54] HIGH PRESSURE HOMOGENIZING PUMP HAVING REMOVABLE CHECK VALVE MODULES

[75] Inventors: John M. Bristol, Rye, N.H.; Robert A. Drainoni, Lexington, Mass.

[73] Assignee: APV Gaulin, Inc., Wilmington, Mass.

[21] Appl. No.: 279,687

[22] Filed: Jul. 25, 1994

Related U.S. Application Data

[63] Continuation of Ser. No. 97,665, Jul. 27, 1993, abandoned.

[51] Int. Cl.⁶ ........................ F04B 21/02; F16K 15/04

[52] U.S. Cl. .................................... 417/454; 417/539; 417/560; 417/568; 417/569; 137/454.4

[58] Field of Search ............... 417/454, 533, 539, 560, 417/563, 567, 568, 569, 571; 137/454.4, 533.11

[56] References Cited

U.S. PATENT DOCUMENTS

| | | | |
|---|---|---|---|
| 1,118,963 | 12/1914 | Stage | 417/571 |
| 1,775,975 | 9/1930 | Swainson | 417/454 |
| 2,081,221 | 5/1937 | Coberly et al. . | |
| 2,319,604 | 5/1943 | Hennessy | 137/533.11 |
| 2,796,769 | 6/1957 | Gratzmuller | 417/569 |
| 3,119,410 | 1/1964 | Noecker | 137/454.4 |
| 3,128,718 | 4/1964 | Rhodes et al. . | |
| 3,216,365 | 11/1965 | Dettinger et al. | 417/568 |
| 3,309,014 | 3/1967 | Bauer et al. . | |
| 3,726,612 | 4/1973 | Green | 417/568 |
| 4,146,355 | 3/1979 | Broker et al. . | |
| 4,242,063 | 12/1980 | Pareja | 417/454 |
| 4,412,792 | 11/1983 | LaBorde et al. . | |
| 4,716,924 | 1/1988 | Pacht . | |
| 4,737,084 | 4/1988 | Hammelmann . | |
| 4,768,933 | 9/1988 | Stachowiak . | |
| 4,773,833 | 9/1988 | Wilkinson et al. | 417/539 |
| 4,878,815 | 11/1989 | Stachowiak . | |
| 5,127,807 | 7/1972 | Eslinger | 417/539 |

FOREIGN PATENT DOCUMENTS

| | | | |
|---|---|---|---|
| 960950 | 9/1930 | France | 417/568 |
| 715503 | 12/1941 | Germany | 230/172 |
| 2336973 | 7/1973 | Germany | 417/568 |
| 971419 | 9/1964 | United Kingdom | 417/568 |

*Primary Examiner*—Richard A. Bertsch
*Assistant Examiner*—Roland G. McAndrews, Jr.
*Attorney, Agent, or Firm*—Hamilton, Brook, Smith & Reynolds

[57] ABSTRACT

A homogenizer includes a homogenizing valve assembly mounted to a pump block. A set of one or more pump chambers is formed in the block and a plunger is positioned in each chamber. Each pump chamber is formed along a substantially horizontal pump axis and extends through the pump block. A removable check valve module comprising a suction valve assembly and a discharge valve assembly is positioned in a bore which intersects each pump chamber. Each valve module is secured in the bore by a retaining pin such that the module can be easily and quickly removed as a single unit.

60 Claims, 4 Drawing Sheets

HIGH PRESSURE HOMOGENIZING PUMP HAVING REMOVABLE CHECK VALVE MODULES

This application is a continuation of application Ser. No. 08/097,665 filed on Jul. 27, 1993, now abandoned, which is incorporated herein by reference in its entirety.

BACKGROUND

Homogenization is the breaking down and mixing of the components of an emulsion or dispersion. A major use of homogenizers is to break down and disperse milk fat into the bulk of skim milk. This delays creaming of milk fat globules. Homogenizers are also used to process other emulsions such as silicon oil and to process dispersions such as pigments, antacids and various paper coatings.

In the most widely used type of homogenizer, the emulsion is introduced at high pressure of from 500 psi to 10,000 psi to a central bore within an annular valve seat. The emulsion is forced out through a narrow gap between the valve seat and a valve member. Through the gap, the emulsion undergoes extremely rapid acceleration as well as an extreme drop in pressure. This violent action through the valve breaks down globules within the emulsion to produce the homogenized product.

The degree of homogenization is a function of the difference between the pressure of the emulsion at the inlet of the valve and the pressure at the outlet. In the past, homogenizers have not typically been required to operate at pressures of greater than 10,000 psi. However, recent applications such as cell disruption have required significantly higher pressures of about 15,000 psi or more.

A typical homogenizer system includes a homogenizer valve mounted to the side of a pump block. The pump is a plunger pump having multiple plungers which draw fluid from a common suction manifold and discharge it into a common discharge manifold delivering high pressure fluid to the homogenizer valve. The suction and discharge manifolds are cross bores which extend parallel to opposite faces of the block. Valve bores drilled through one of those faces join the two manifolds, and a check valve assembly is positioned at each end of each of those valve bores. Another set of bores is drilled through an adjacent face of the block to form pump chambers which house the plungers. Each pump chamber extends along a substantially horizontal pump axis and intersects each valve bore at about a 90 degree angle. Each plunger reciprocates in a pump chamber to draw fluid at a higher pressure through a suction valve from the suction manifold and force the fluid through the discharge valve into the discharge manifold which is connected to the homogenizer valve. As such, the homogenizer has a primary fluid flow path extending from the suction manifold and through the suction valves, the pump chambers, the discharge manifold and the homogenizer valve.

SUMMARY OF THE INVENTION

It has been found that stress cracks develop in the pump block of existing high pressure homogenizers at the intersections of the pump chamber and the valve bores. These cracks are attributed to the repeated translational motion of the plungers in their respective pump chambers and the resultant pressure variations. Once stress cracks have developed in a homogenizer, the pump block usually needs to be replaced. However, repairing the pump block is a complicated procedure which can be time consuming. Also, replacement of the pump block can be extremely expensive as it typically constitutes about half the value of the homogenizer.

The present invention is directed to a pump in which the stress that results in the aforementioned stress cracks is substantially isolated in an easily removable check valve module located in the pump block. The pump includes a pump chamber formed in the block along a substantially horizontal pump axis. The check valve module is removably mounted in a bore formed in the pump block to intersect the distal end of the pump chamber. More specifically, the check valve module is secured to the pump block by a retaining pin or the like such that the module can be easily removed as a single unit. The valve module comprises suction and discharge valve assemblies. Each valve assembly is disposed along a substantially vertical axis angled relative to the pump chamber axis and is in fluid communication with the pump chamber.

A homogenizer employing the pump of the present invention offers significant advantages over existing homogenizing systems. One advantage is that the present invention is typically less expensive to repair with respect to stress related problems than existing systems. When stress related problems do arise in the homogenizer of the present invention, the entire pump block does not usually require replacement as only the less expensive check valve modules need to be repaired or replaced. Another advantage is that the "down-time" period during which the homogenizer is nonoperational for stress related repairs of damaged valve modules is significantly reduced.

Each check module can be prestressed when mounted in a respective bore of the pump block by angling the surfaces of the bore and module. However, installation of each tapered module would require a clamping mechanism to force the module in place within the bore. Similarly, removal of each tapered module would require an extraction mechanism more complicated than that used for a non-tapered module. As such, the check valve modules are preferably not prestressed when mounted in the pump block such that replacement of a damaged module can be easily accomplished by removing a single retaining pin. As such, repairs or replacement of the valve modules can be accomplished rapidly such that "down-time" is minimized.

In one detailed embodiment, a homogenizer includes a homogenizing valve assembly mounted to a pump block. A set of one or more pump chambers is formed in the block. Each pump chamber is formed along a substantially horizontal pump axis and has a distal end terminating within the pump block. A set of bores are formed in an adjacent face of the block along the pump axes such that each bore intersects the distal end of one of the pump chambers. A removable valve module comprising a suction valve assembly and a discharge valve assembly is positioned in each bore. Preferably, each valve module is secured in the bore by a retaining pin such that the module can be easily and quickly removed as a single unit.

Each valve module includes a conduit which provides fluid communication paths between the suction and discharge valve assemblies and the distal end of the pump chamber. Each valve assembly within a valve module is disposed along a substantially vertical axis which is perpendicular to the pump axis. The suction valve assemblies within each valve module are in communication with each other through a suction cross-bore, and the discharge valve assemblies are in communications with each other through a discharge cross-bore. A pressure sensor can be coupled to the discharge bore through an isolation piston for providing pressure indications.

Within a respective check valve module each valve assembly is generally vertically oriented. Each valve assembly includes a ball valve located in a valve bore above a valve seat and a "valve member" adjacent to the ball which serves as a valve stop and guide. For the suction valve assembly, a portion of the check valve module serves as the valve member. For the discharge valve assembly, a portion of the pump block serves as the valve member. These valve assemblies do not employ valve springs which can become clogged with product thus serving as a site for undesirable microorganism growth. As such, the system is particularly useful for sanitary processing applications involving food products or the like.

A homogenizer of the present invention can be operated at high pressures in the range of about 5000 to 30,000 PSI.

BRIEF DESCRIPTION OF THE DRAWINGS

The foregoing and other objects, features and advantages of the invention will be apparent from the following more particular description of preferred embodiments of the invention, as illustrated in the accompany drawings in which like reference characters refer to the same parts throughout the different views. The drawings are not necessarily to scale, emphasis instead being placed on illustrating the principles of the invention.

DETAILED DESCRIPTION OF A PREFERRED EMBODIMENT

Figure 1A:
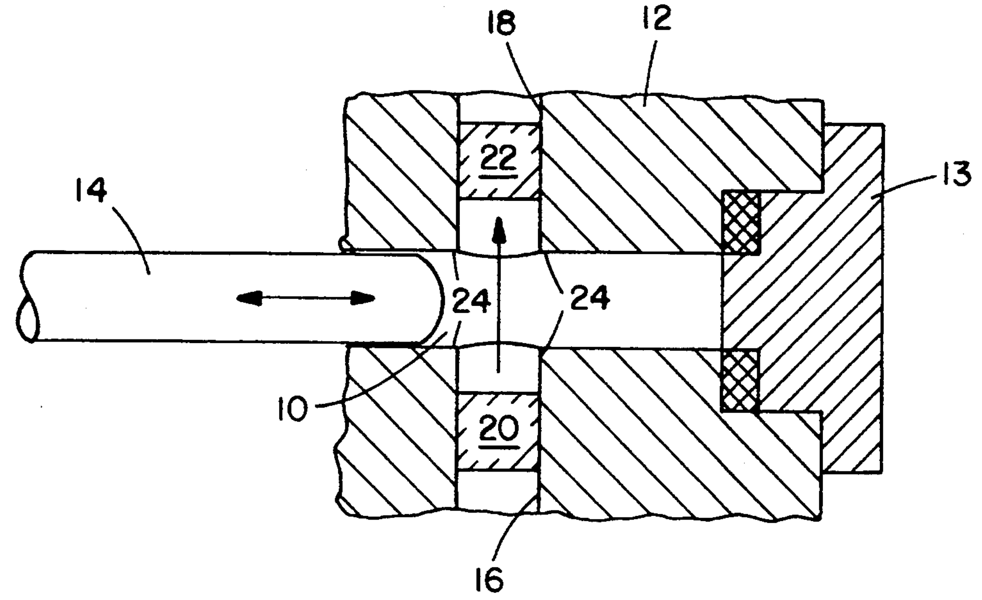
FIG. 1A (PRIOR ART)
FIG. 1A is a partial cross-sectional view of a pump of a prior art homogenizing system.

A section of a prior art homogenizer pump is shown in FIG. 1A. The pump includes a pump chamber 10 formed along a substantially horizontal pump axis in the pump block 12 and terminating at an end cap 13. A plunger 14 reciprocates in the chamber 10. Suction and discharge valve bores (16 and 18) are formed in the pump block along a substantially vertical axis to intersect the pump chamber 10. A suction valve 20 is positioned in the suction valve bore 16, and a discharge valve 22 is positioned in the discharge valve bore 18. When employed in high pressure applications, such prior art homogenizer systems have been found to develop stress cracks at the intersections 24 of the pump chamber 12 and the suction and discharge valve bores (16 and 18). The stress cracks are attributed to the stress that develops at the pump chamber/valve bore intersections 24 due to the pressure variations with repeated translational motion of the plunger 14 in the pump chamber 12. Once stress cracks have developed, the entire pump block typically requires repair or replacement. This can be time consuming and quite expensive.

In the present invention, the homogenizer pump's internal geometry is configured such that stress due to the repeated translational motion of the plunger and the like is substantially isolated in an easily removable check valve module located in the pump block. If stress related problems do arise in a homogenizer of the present invention, resulting stress cracks or other stress-related damage will usually be limited to the easily replaceable check valve module. As such, the entire pump block typically does not need to be repaired or replaced.

Figure 1B:
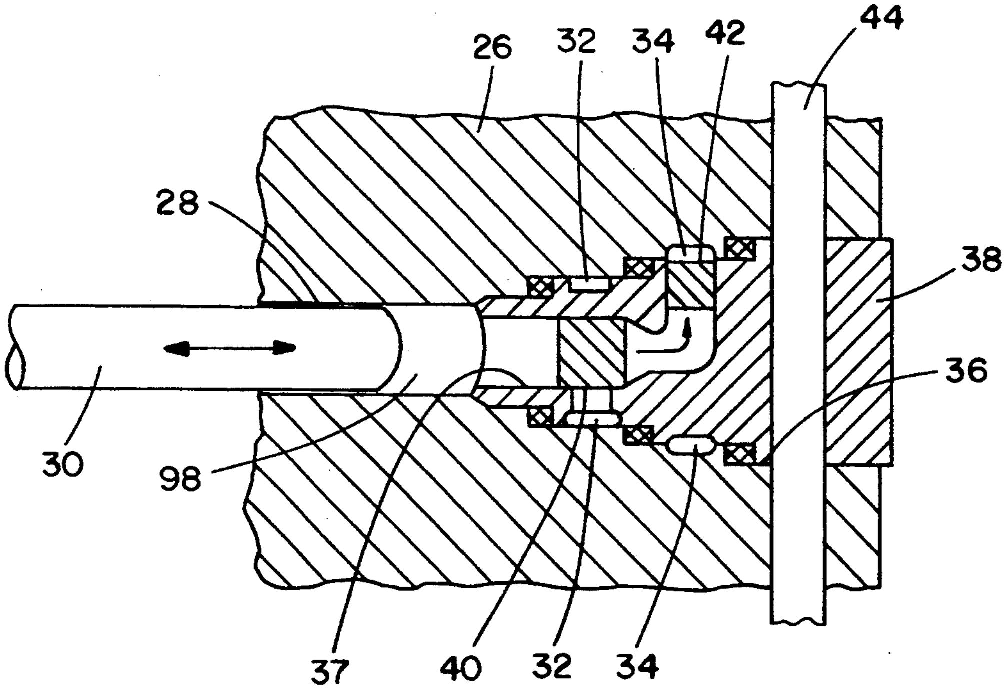
FIG. 1B is a partial cross-sectional view of a pump of a homogenizing system which illustrates a removable check valve module of the present invention.

FIG. 1B illustrates a section of a homogenizing pump embodying the basic principles of the invention. A pump block 26 includes a pump chamber 28 formed along a substantially horizontal pump axis. A plunger 30 reciprocates in the chamber 28. Suction and discharge manifolds (not shown) are cross-bores extending through the pump block 26. A first annulus 32 provides a fluid communication path to the suction manifold, and a second annulus 34 provides a fluid path to the discharge manifold. A bore 36 is formed in the block along the pump axis to intersect the distal end of the pump chamber 28 and the annuli (32 and 34). A check valve module 38 is positioned in the bore 36. Suction and discharge valve assemblies (40 and 42) are located within the module 38, each disposed along a substantially vertical axis which is generally orthogonal to the pump axis. The valve assemblies (40 and 42) are in fluid communication with the pump chamber 28 via a conduit 37 which is formed in the check valve module 38. The valve module 38 can be prestressed when mounted in the block 26 by angling the surfaces of the bore 36 and the module 38. However, a clamping mechanism (not shown) would be required for installation of the tapered module 38 to force it into place in the bore 36. Similarly, an extraction tool (not shown) more complicated than one used for a non-tapered module would be required to remove the tapered module 38. As such, the valve module 38 is mounted in the block 26 without prestressing, secured in the bore 36 with a retaining pin 44. As such, the module 38 can be quickly and easily removed as a single unit.

Figure 2:
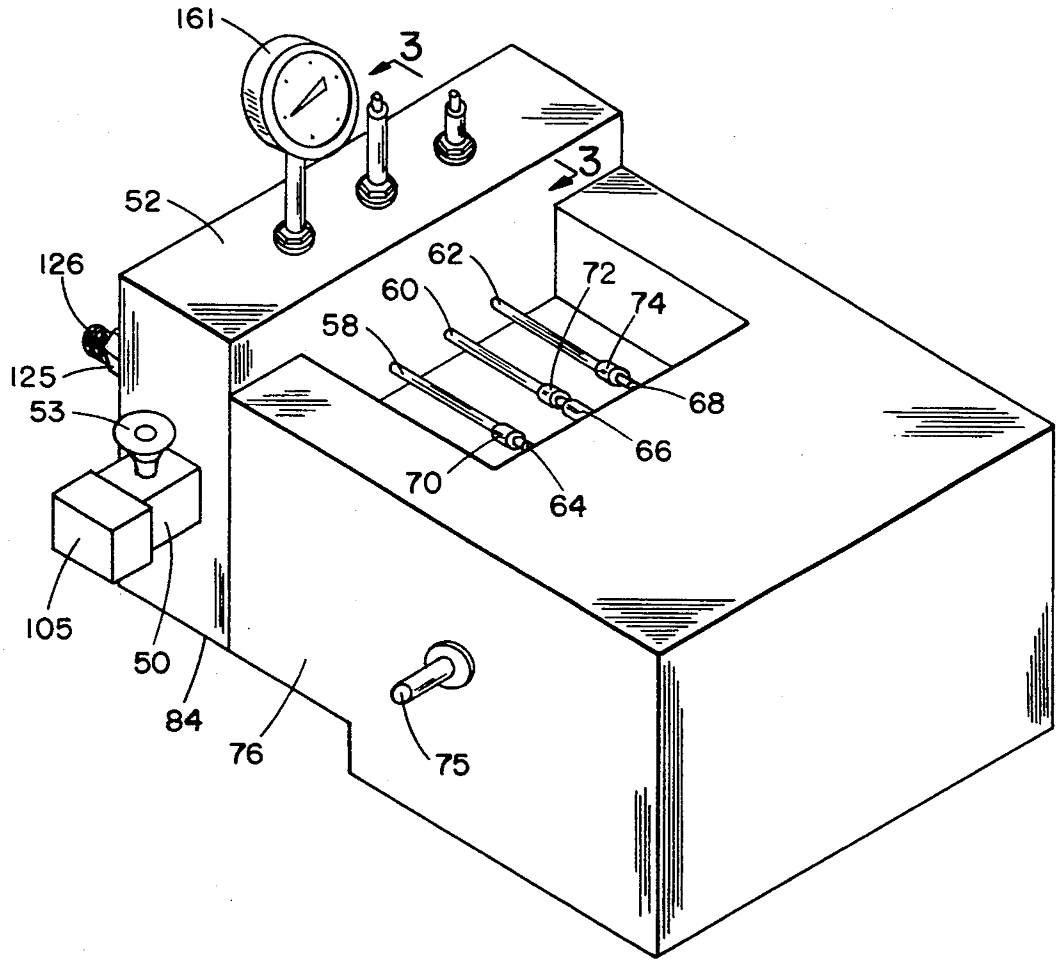
FIG. 2 is a perspective view of a homogenizer valve and pump assembly embodying check valve modules of the present invention.

FIG. 2 is a perspective view of a homogenizer system of the present invention. The view is from a direction which a user would consider to be the rear of the system to show the plunger drive. A homogenizer valve 50 is mounted to a pump block 52. The valve assembly 50 receives pressurized fluid from the pump, and the homogenized fluid is discharged through a flanged port 53. Pressure of the fluid entering the homogenizer system can be monitored by a high pressure gauge 161 mounted to the block 52.

The pump comprises three horizontal plungers which operate, in parallel, 120° out of phase with each other. Plungers 58, 60 and 62 are coupled to respective plunger adapters 64, 66, and 68 by means of respective compression couplings 70, 72 and 74. The connecting rods and crossheads (not shown) are driven through an eccentric shaft 75 located in the pump base 76, by an electric motor (not shown), and are connected to the plunger adapters 64, 66 and 68. While pumps with three plungers are shown and described herein, it is noted that any number of plungers in pumps capable of providing a relatively constant flow rate fluid to the homogenizing valve assembly 50 may be employed without departing from the scope of the present invention.

Figure 3:
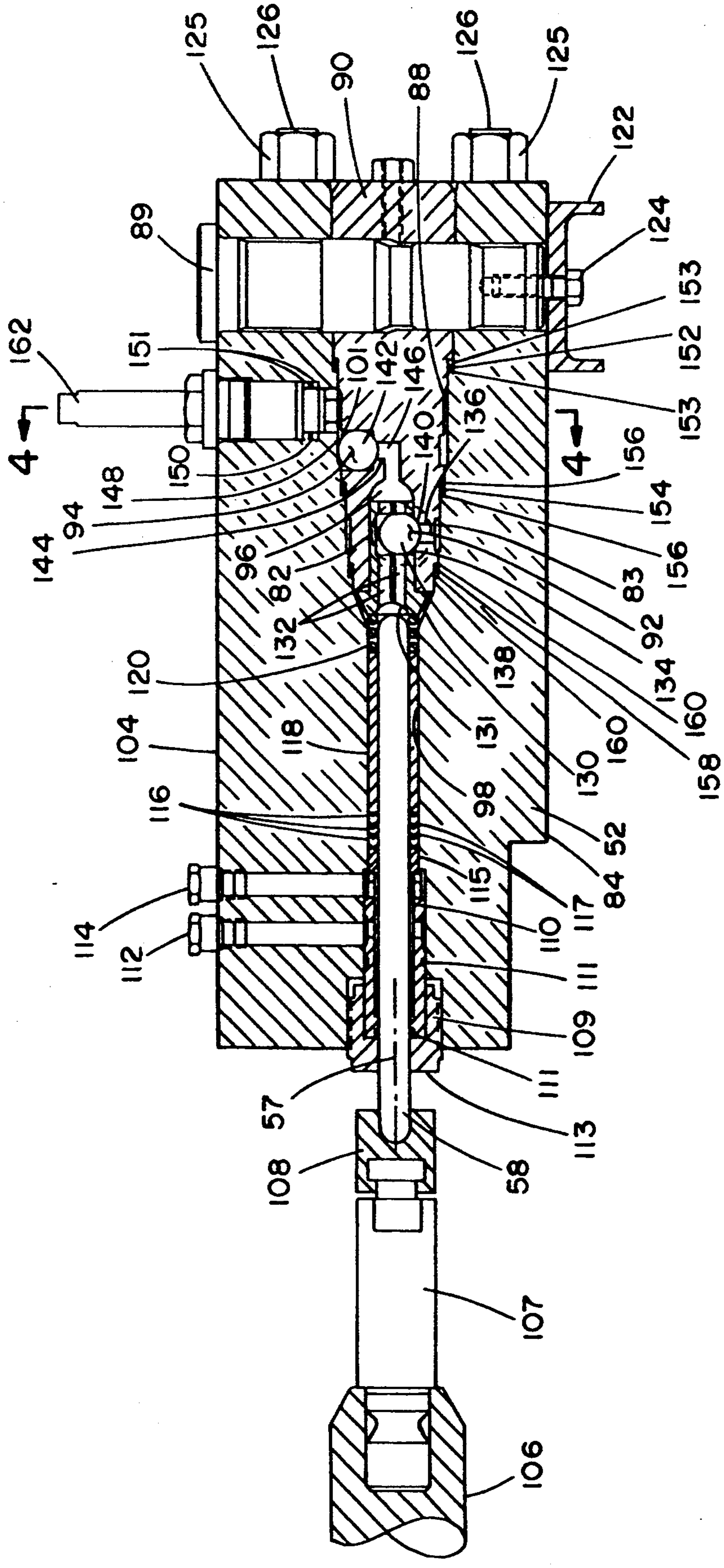
FIG. 3 is a cross-sectional view of the pump of FIG. 2 taken along line 3—3.

Referring to FIG. 3, fluid is drawn into the pump block 52 through a port (not shown) into a suction manifold 82 (dashed lines). The manifold 82 is a cross-bore extending into the distal horizontal bore 88 in the block 52 parallel to the bottom face 84. The suction manifold also extends through three horizontal bores 88 in which a set of three removable check valve modules 90 are positioned (See FIG. 4). For simplicity of illustration, one check valve module is illustrated in FIG. 3.

The check valve module 90 is mounted in the bore 88 without prestressing, secured to the pump block 52 by a retaining pin 89. As such, the module 90 can be quickly and easily removed for cleaning, repairs or replacement. The check valve module 90 includes suction and discharge valve assemblies (92 and 94) which are each disposed along a substantially vertical axis which is perpendicular to the pump axis 57. The valve assemblies are discussed in detail below. A conduit 96 extends through the module 90 and provides a fluid communication path to a pump chamber 98. Fluid from the suction manifold 82 (FIG. 4) is drawn into an annulus 83, through the suction valve 92 and conduit 96, and into the pump chamber 98. The plunger 58 drives fluid from the pump chamber 98 back through the conduit 96 to the discharge valve 94.

Figure 4:
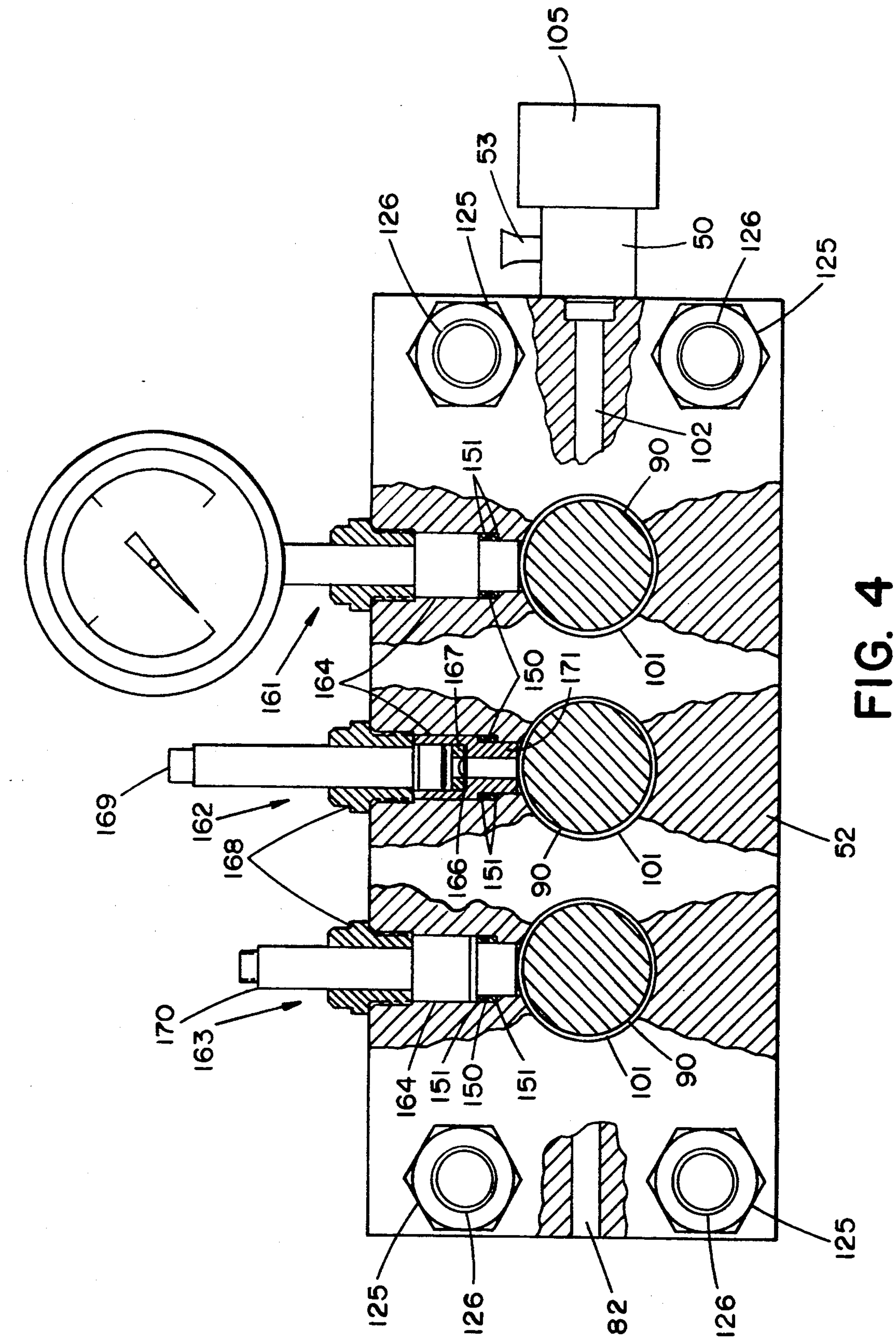
FIG. 4 is a partial cross-sectional view of the pump of FIG. 3 taken along line 4—4.

Referring to FIG. 4, the discharge valve 94 (not shown in FIG. 4) is in fluid communication with the discharge manifold 102 via a second annulus 101. The discharge manifold 102 is a cross-bore extending parallel to the upper face of the block 52. The fluid from the set of three discharge valves 94 is directed by the manifold 102 to the homogenizing valve assembly 50 for homogenization. The final homogenized product exits through the discharge port 53. The pump is a constant volume pump, and pressure is maintained by adjusting the homogenizing valve assembly 50. Those adjustments are made by a hydraulic actuator assembly 105.

Referring to FIG. 2, the pump block studs 126 are threaded into the pump base 76. The pump block 52 is tightened to the pump base 76 by means of the pump block stud nuts 125.

Referring back to FIG. 3, the pump chamber 98 is formed in the pump block 52 along a pump axis 57 which is parallel to the upper and lower faces of the block. The plunger 58 is coupled to a connecting rod 106 by a plunger adapter 107 and a compression coupling member 108. The plunger 58 is driven in a bearing or lantern ring 109 which is cooled by fluid passing through an annulus 110 from an inlet port 112 to a discharge port 114. A pair of seals 111 are provided to ensure that the fluid or steam remains in the annulus 110. A bearing adjustment screw 113 secures one end of the bearing 109 in the pump chamber 98 (FIG. 1B). The bearing 109 contacts a packing adjustment ring 115 which rests against a packing assembly. The packing assembly includes packing material 116 and back-up rings 117. A dynamic seal is maintained by the packing assembly which is retained by a plunger ring 118. The ring 118 rests against a spring 120 which is compressed against the check valve module 90.

A check valve module 90 is positioned in a bore 88 which is formed in the pump block 52 along the horizontal pump axis 57 to intersect the pump chambers 82 and 102 (FIG. 4). The valve module 90 is mounted in the bore 88 and secured to the pump block 52 by the retaining pin 89, a washer 122 and a screw 124. As such, the module 90 is readily removable. An advantage of the ease of removal of the check valve modules is that cleaning or repairs within the pump chamber 98 can be accomplished without significant disassembly of the pump block. For example, the packing assembly 116 can be easily installed or removed with minimal disassembly of the homogenizer system. To that end, the plunger 58 can be removed by rotating the eccentric shaft 75 (FIG. 2) so that the previously loosened compression coupling 108 (FIG. 3) is drawn away from the plunger 58 (FIG. 3), thus allowing space for the plunger to be removed from the rear of the cylinder block. The check valve module 90 can be removed after removing the washer 122, the screw 124 and the retaining pin 89. The bearing 109, the packing adjustment ring 115, the packing assembly 116 and 117 and the plunger ring 118 can then be removed by pushing a cylindrical tool through the pump chamber 98 after removing the adjustment screw 113 and the spring 120.

Each check valve module 90 includes a conduit 96 which provides a fluid communication path between the suction and discharge valve assemblies (92 and 94) and the pump chamber 98. The conduit 96 extends through the module 90 from the pump chamber 98 along the horizontal pump axis intersecting channel 136 which is in fluid communication with the annulus 83. Adjacent to the annulus 83, the conduit 96 becomes narrower continuing to extend along the pump axis 57 and then bends about 90° extending substantially in a vertical direction (at 146) to intersect the second annulus 101.

Each suction valve assembly 92 is ball check valve which is located in the conduit 96 adjacent to the distal end of the pump chamber 98. The valve assembly 92 includes a valve member 130 which corresponds to a portion of the check valve module 90. The valve member 130 has a horizontal channel 132 in fluid communication with the pump chamber 98 and a vertical opening 134 in fluid communication with a channel 136 formed in the module 90. The channel 136 intersects the annulus 83 which is in fluid communication with the suction manifold 82 (FIG. 4). A ball 138 is positioned in the valve member 130 above a portion 140 of the check valve module 90 which serves as a valve seat. The ball 138 closes the channel 136 when positive back pressure is applied. The valve member 130 serves as a ball guide and stop and has a hemispherical termination 131 formed in its end adjacent to the distal end of the pump chamber 98.

Each discharge valve assembly 94 comprises a ball 142 positioned adjacent to a portion 144 of the module 90 which serves as a valve seat. Fluid communication to the discharge valve 94 is provided by the vertical portion 146 of the conduit 96 which extends through the valve seat 144. A pump block portion 148 of the block 52 serves as a valve member. The portion 148 is disposed above the ball 142, serving as a ball stop.

A homogenizer system employing the above-described check valve modules is particularly useful for sanitary processing applications involving food products or the like. The homogenizer includes multiple horizontal pump chambers intersecting respective bores in which check valve modules are positioned. Within each check valve module, the suction and discharge valve assemblies are each vertically oriented in that they are disposed along an axis perpendicular to the substantially horizontal pump axis. As such, ball closure for each valve assembly is gravity assisted. Consequently, these valve assemblies do not employ valve springs which can easily become clogged with product during processing and thus serve as a site for microorganism growth.

A homogenizer employing check valve modules can be operated at pressures in a range of about 5000 to 30,000 PSI. To accomplish this, a plurality of reinforced seals are positioned along the fluid path. Front, middle and rear seals (152, 154 and 158) are positioned in the bore 88 adjacent to the check valve module 90. These seals (152, 154 and 158) are each positioned between a pair of back-up rings (153, 156 and 160). Referring to FIG. 4, the pump block 52 comprises three assemblies (161, 162 and 163). Each of the three assemblies (161, 162, 163) is positioned in a respective bore 164 which is in fluid communication with the discharge manifold 102. Each assembly (161, 162 and 163) comprises a retaining screw 168 positioned in each bore 164. A seal 150 and back-up ring 151 is located in each bore 164 for sealing the assemblies 161, 162 and 163. The assembly 162 also includes a rupture disc 166 and supporting ring 167 disposed within the rupture disc holder 171. A rupture disc retaining screw 169 is positioned within the rupture disc holder 171 to retain the disc 166 and ring 167. For the assembly 163, a pressure transmitter 170 is positioned within the retaining screw 168. The high pressure gauge assembly 161 includes a retaining screw 168 which is an intrinsic part of the high pressure gauge assembly 161. The pressure gauge assembly 161 and the pressure transmitter 170 both provide discharge pressure indications. The rupture disc assembly 162 is a safety device. It includes a rupture disc 166 which is intended to burst within the minimum and maximum limits of predetermined pressure, thus preventing an excessive discharge pressure from damaging the machine.

EQUIVALENTS

While the invention has been particularly shown and described with reference to preferred embodiments thereof, it will be understood by those skilled in the art that various changes in form and details may be made therein without departing from the spirit and scope of the invention as defined by the appended claims. For example, although not specifically shown, a one or two stage homogenizing valve and actuator assembly may be used.

What is claimed is:

1. A pump comprising: a pump block;

a pump chamber formed in the pump block along a substantially horizontal pump axis;

a horizontal bore formed in the pump block to intersect a distal end of the pump chamber;

a removable valve module positioned in the bore, the module comprising a suction valve assembly and a discharge valve assembly, each being in communication with the distal end of the pump chamber, each valve assembly disposed along a substantially vertical axis angled relative to the pump axis; and a retaining pin for mounting the module to the pump block, the retaining pin extending transversely to the pump axis through the module.

2. A pump as claimed in claim 1 wherein the module is removable as an integral unit.

3. A pump as claimed in claim 1 wherein each valve assembly is disposed in the module along said substantially vertical axis perpendicular to the pump axis.

4. A pump as claimed in claim 1 wherein the module further comprises a conduit in communication with the distal end of the pump chamber and coupled to each valve assembly.

5. A pump as claimed in claim 1 wherein each valve assembly comprises a valve stop, a valve ball and a valve seat.

6. A pump as claimed in claim 1 wherein the module is removably mounted to the pump block by the retaining pin.

7. A pump as claimed in claim 1 wherein the bore is formed through the pump block along the pump axis.

8. A pump as claimed in claim 1 wherein an operating pressure of the pump is at least 5000 PSI.

9. A pump as claimed in claim 8 wherein the operating pressure is up to about 30,000 PSI.

10. A pump as claimed in claim 1 wherein the pump is adapted for sanitary applications.

11. A pump as claimed in claim 1 comprising three pump chambers formed in the pump block along respective pump axes, three bores each intersecting a respective pump chamber and three modules each positioned in a respective bore, each module comprising a suction valve assembly and a discharge valve assembly, the suction valve assemblies being in communication with each other through a suction manifold and the discharge valve assemblies being in communication with each other through a discharge manifold.

12. A pump as claimed in claim 1 further comprising a homogenizing valve assembly mounted to the block in communication with the discharge valve.

13. A pump as claimed in claim 1 further comprising pressure sensors coupled to the discharge manifold.

14. A pump as claimed in claim 1 wherein the distal end of the pump chamber has a hemispherical termination.

15. A pump as claimed in claim 1 further comprising a plunger adapted to reciprocate in the pump chamber and sealably joining an inner surface of the pump chamber.

16. A pump as claimed in claim 1 wherein the retaining pin seats in the pump block above and below the module.

17. A pump comprising:

a pump block;

a suction manifold in the pump block;

a discharge manifold in the pump block;

a pump chamber formed in the pump block along a substantially horizontal pump axis and having a distal end within the pump block;

a bore formed in the pump block along an axis parallel to the pump axis to intersect the distal end of the pump chamber, the bore being in communication with the suction manifold and the discharge manifold;

a removable valve module positioned in the bore and comprising a suction valve assembly for coupling the suction manifold to the pump chamber and a discharge valve assembly for coupling the discharge manifold to the pump chamber, each valve assembly disposed along a substantially vertical axis angled relative to the pump axis; and a retaining pin for mounting the module to the pump block, the retaining pin extending transversely to the pump axis through the module.

18. A pump as claimed in claim 17 wherein the module is removably mounted to the pump block by the retaining pin, the module being removable as an integral unit.

19. A pump as claimed in claim 17 wherein each valve assembly is disposed along said substantially vertical axis perpendicular to the pump axis.

20. A pump as claimed in claim 17 wherein each valve module further comprises a conduit in communication with the distal end of the pump chamber, the suction valve assembly connecting the suction manifold to the conduit and the discharge valve assembly connecting the discharge manifold to the conduit.

21. A pump as claimed in claim 17 wherein each valve assembly comprises a valve stop, a valve ball and a valve seat.

22. A pump as claimed in claim 17 wherein the bore is formed through the pump block along the pump axis.

23. A pump as claimed in claim 17 wherein an operating pressure of the pump is at least 5000 PSI and up to about 30,000 PSI.

24. A pump as claimed in claim 17 further comprising a homogenizing valve assembly mounted to the block in communication with the discharge valve assembly.

25. A homogenizer comprising:

a pump block;

a suction manifold in the pump block;

a discharge manifold in the pump block;

a set of pump chambers each formed in the pump block along a substantially horizontal pump axis, each pump chamber having a distal end terminating within the pump block;

a set of bores parallel to the pump axes each formed in the pump block to intersect the distal end of one of the pump chambers, each bore being in communication with the suction manifold and the discharge manifold;

a removable valve module positioned in each bore and comprising a suction valve assembly for coupling the suction manifold to the pump chamber and a discharge valve assembly for coupling the discharge manifold to the pump chamber, each valve assembly positioned in the module along a substantially vertical axis angled relative to the pump axis;

a homogenizing valve mounted to the block in communication with the discharge valve assembly; and a retaining pin for mounting each module to the pump block, the retaining pin extending transversely to the pump axis through the module.

26. A homogenizer as claimed in claim 25 wherein each one of the modules further comprises a conduit in communication with the distal end of the pump chamber, a suction valve bore connecting the suction manifold to the conduit and housing the suction valve assembly, and discharge valve bore connecting the discharge valve bore to the conduit and housing the discharge valve.

27. A homogenizer as claimed in claim 25 wherein each valve assembly comprises a valve stop, a valve ball and a valve seat.

28. A homogenizer as claimed in claim 25 wherein each module is removably mounted to the pump block by the corresponding retaining pin.

29. A homogenizer as claimed in claim 25 wherein each bore is formed through the pump block along the pump axis.

30. A homogenizer as claimed in claim 25 wherein an operating pressure of the homogenizer is between 5000 PSI and 30,000 PSI.

31. A homogenizer comprising:

a pump block;

a suction manifold in the pump block;

a discharge manifold in the pump block;

a set of pump chambers each formed in the pump block along a substantially horizontal pump axis, each pump chamber having a hemispherical distal end terminating within the pump block;

a set of bores each formed in the pump block along an axis parallel to the pump axis to intersect the distal end of a respective one of the pump chambers, each bore being in fluid communication with the suction manifold and the discharge manifold;

a valve module removably mounted in each bore, the module comprising a suction valve assembly and a discharge valve assembly, each valve assembly positioned in the module along a substantially vertical axis being substantially orthogonal to the pump axis, the module having a conduit in fluid communication with the distal end of the pump chamber, the suction valve assembly coupling the suction manifold to the conduit and discharge valve assembly coupling the discharge manifold to the conduit;

retaining means for securing each module in the bore, the retaining means extending transversely to the bore, through the module; and a homogenizing valve mounted to the block in communication with the discharge manifold.

32. A pump comprising:

a pump block;

a pump chamber formed in the pump block;

a bore formed in the pump block to intersect the pump chamber; and a removable valve module positioned in the bore and in communication with the distal end of the pump chamber, the module being mounted to the pump block by a retaining pin such that the module is removable as an integral unit, the retaining pin extending transversely to a longitudinal axis of the bore, through the module.

33. A pump as claimed in claim 32 wherein the pump chamber is formed along a substantially horizontal pump axis.

34. A pump as claimed in claim 32 wherein the valve module comprises a suction valve assembly and a discharge valve assembly each being in communication with the pump chamber.

35. A pump as claimed in claim 32 wherein each valve assembly is disposed along a substantially vertical axis angled relative to the pump axis.

36. A pump as claimed in claim 32 wherein the module further comprises a conduit in communication with the pump chamber and coupled to each valve assembly.

37. A pump as claimed in claim 32 wherein each valve assembly comprises a valve stop, a valve ball and a valve seat.

38. A pump as claimed in claim 32 wherein an operating pressure of the pump is up to about 30,000 PSI.

39. A pump as claimed in claim 32 further comprising three pump chambers formed in the pump block along respective pump axes, three bores each intersecting a respective pump chamber and three modules each positioned in a respective bore and in communication with the pump chamber, each module comprising a suction valve assembly and a discharge valve assembly, the suction valve assemblies being in communication with each other through a suction manifold and the discharge valve assemblies being in communication with each other through a discharge manifold, each module being mounted to the pump block by a respective retaining pin such that said module is removable as an integral unit.

40. A pump as claimed in claim 32 further comprising a homogenizing valve mounted to the pump block and in communication with the discharge valve.

41. A pump as claimed in claim 32 wherein the pump is adapted for sanitary applications.

42. A method of constructing a homogenizer pump comprising;

providing a pump block;

forming a pump chamber in the pump block along a substantially horizontal pump axis;

forming a bore in the pump block along an axis parallel to the pump axis to intersect a distal end of the pump chamber;

positioning a removable valve module in the bore, the module comprising a suction valve assembly and a discharge valve assembly, each assembly in communication with the distal end of the pump chamber and disposed along a substantially vertical axis angled relative to the pump axis; and mounting the module to the pump block with a retaining pin extending transversely to the pump axis through the module.

43. A method as claimed in claim 42 wherein the retaining pin seats in the pump block above and below the module.

44. A removable valve module for a pump including a pump block, a pump chamber formed in the pump block along a substantially horizontal pump axis, and a horizontal bore formed in the pump block to intersect a distal end of the pump chamber, the removable valve module comprising:

a suction valve assembly and a discharge valve assembly adapted to be in fluid communication with the distal end of the pump chamber, each valve assembly being oriented transversely to the pump axis, the removable valve module being adapted to be positioned in the bore; and a substantially "L" shaped conduit formed in the module, the conduit comprising a horizontal leg terminating in the distal end of the pump chamber and a vertical leg terminating in the discharge valve assembly, the suction valve assembly occupying a portion of the horizontal leg to place the horizontal leg in fluid communication with an intake channel extending vertically to intersect the horizontal leg from below the intake channel.

45. A module as claimed in claim 44 wherein the module is adapted to be removable from the bore as an integral unit.

46. A module as claimed in claim 44 wherein each valve assembly is disposed in the module along a substantially vertical axis.

47. A module as claimed in claim 44 wherein the module further comprises a conduit adapted to be in communication with the distal end of the pump chamber and each valve assembly.

48. A module as claimed in claim 44 wherein each valve assembly comprises a valve stop, a valve ball, and a valve seat.

49. A module as claimed in claim 44 wherein the module is adapted to be removably mounted to the pump block by a retaining pin extending transversely to the bore, through the module.

50. A module as claimed in claim 44 wherein the bore is formed partially through the pump block along the pump axis.

51. A module as claimed in claim 44 wherein the distal end of the pump chamber has a hemispherical termination.

52. A pump comprising:

a pump block;

a pump chamber formed in the pump block;

a bore formed in the pump block substantially coaxial to the pump chamber;

a removable valve module positioned in the bore, the module comprising a suction valve and a discharge valve assembly, each being in communication with a distal end of the pump chamber; and a retaining pin for mounting the module to the pump block, the retaining pin extending transversely to the pump chamber, through the module.

53. A pump as claimed in claim 52 wherein the retaining pin seats in the pump block above and below the module.

54. A pump as claimed in claim 52 wherein each valve assembly is oriented vertically and comprises a valve ball capable of being vertically displaced to thereby open the corresponding valve assembly.

55. A pump as claimed in claim 54 further comprising a plunger adapted to reciprocate in the pump chamber and sealably joining an inner surface of the pump chamber.

56. A pump as claimed in claim 52 wherein a substantially "L" shaped conduit is formed in the module, the conduit comprising a horizontal leg in direct fluid communication with the distal end of the pump chamber and a vertical leg.

57. A pump as claimed in claim 56 wherein the vertical leg terminates in the discharge valve assembly.

58. A pump as claimed in claim 57 wherein the suction valve assembly occupies a portion of the horizontal leg to place the horizontal leg in fluid communication with an intake channel extending vertically to intersect the horizontal leg from below the intake channel.

59. A removable valve module adapted for a pump comprising a pump block, a pump chamber formed in the pump block, a bore formed in the pump block to intersect the pump chamber, the module adapted to be positioned in the bore in communication with the distal end of the pump chamber and to be mounted to the pump block by a retaining pin extending transversely to a longitudinal axis of the bore, through the module.

60. A module as claimed in claim 59 wherein the retaining pin seats in the pump block above and below the module.

* * * * *